United States Patent [19]

Sage

[11] Patent Number: 5,376,699

[45] Date of Patent: Dec. 27, 1994

[54] SURFACE COATING MEDIUM

[75] Inventor: Ian C. Sage, Dorset, Great Britain

[73] Assignee: Merck Patent Gesellschaft Mit Beschrankter Haftung, Darmstadt, Germany

[21] Appl. No.: 43,723

[22] Filed: Apr. 8, 1993

[30] Foreign Application Priority Data

Apr. 8, 1992 [GB] United Kingdom ............. 9207646.2

[51] Int. Cl.$^5$ .......................... C08K 9/00; C09K 19/02
[52] U.S. Cl. ........................ 523/206; 523/210; 252/299.01; 252/299.67; 252/299.7; 428/1; 524/513; 524/514; 524/599; 524/608
[58] Field of Search .......... 252/299.01, 299.67, 252/299.7; 428/1; 524/507, 513, 514, 591; 523/206, 210

[56] References Cited

U.S. PATENT DOCUMENTS

| | | | |
|---|---|---|---|
| 4,022,706 | 5/1977 | David | 252/299.7 |
| 4,186,119 | 1/1980 | Canela et al. | 524/591 |
| 4,276,044 | 6/1981 | Dieterich | 524/591 |
| 4,605,698 | 8/1986 | Briden | 524/591 |
| 4,642,250 | 2/1987 | Spector | 428/1 |
| 4,963,402 | 10/1990 | Wong | 428/1 |
| 5,194,183 | 3/1993 | Münch et al. | 252/299.01 |
| 5,198,148 | 3/1993 | Nakano | 252/299.7 |
| 5,227,422 | 7/1993 | Mitsuji et al. | 524/591 |

FOREIGN PATENT DOCUMENTS

| | | |
|---|---|---|
| 015013 | 2/1972 | Japan . |
| 90/02054 | 3/1990 | WIPO . |

*Primary Examiner*—Tae H. Yoon
*Attorney, Agent, or Firm*—White, Zelano, & Branigan Millen

[57] ABSTRACT

The invention relates to an improved surface coating medium comprising:
a thermochromic liquid crystal,
a binder polymer being capable of film formation or sufficiently adhesive to allow handling of in a dry uncured state, the improvement wherein the medium further comprises a fusible polymer being capable of melting below 300° C. to form a viscous fluid, and to form a nontacky film on cooling. The invention also relates to a method of coating a substrate with the medium and to a substrate, in particular fabric, coated with the medium.

16 Claims, No Drawings

SURFACE COATING MEDIUM

SUMMARY OF THE INVENTION

This invention relates to an improved surface coating medium comprising
a thermochromic liquid crystal,
a binder polymer being capable of film formation or sufficiently adhesive to allow handling of in a dry uncured state,
the improvement wherein the medium further comprises a fusible polymer being capable of melting below 300° C. to form a viscous fluid, and to form a nontacky film on cooling.

This invention concerns the decoration of substrates particularly but not exclusively fibers and fabrics.

It is, of course, well known to decorate fibers or fabrics by applying colors randomly or in a pattern thereto, such as by screen printing. The colors are, therefore, fixed.

Attempts have been made to decorate fabrics with thermochromic substances, i.e., substances which change color with changes in temperature. Such substances have been incorporated in binder polymers (e.g., WO 90/02054) and applied to a variety of substrates but, so far, attempts to apply such to fabrics have been unsatisfactory largely due to the poor handle or feel of the resultant fabric, poor wash resistance and poor visibility of the resultant color change effect.

Thus, an object of this invention is to provide a medium for decorating a substrate whereby the decorated substrate has a high wash resistance and exhibits a thermochromic effect.

Another object of this invention is to provide a substrate, such as a fiber or fabric, having a thermochromic effect.

A further object of this invention is to provide a method of producing a substrate, such as a fiber or fabric, having a thermochromic effect.

Upon further study of the specification and appended claims, further objects and advantages of this invention will become apparent to those skilled in the art.

According to a first aspect of this invention, there is provided an improved surface coating medium comprising
a thermochromic liquid crystal,
a binder polymer being capable of film formation or sufficiently adhesive to allow handling of in a dry uncured state, preferably an emulsion acrylic or urethane in sufficient quantity to bind the powdered fusible polymer, most preferably a water-soluble polymer,
the improvement wherein the medium comprises a fusible polymer being capable of melting below 300° C., preferably below 120° C., to form a viscous fluid, and to form a nontacky film on cooling, in particular, a medium wherein the fusible polymer is a polyester powder or polyamide powder, is most preferred.

According to a second aspect of the invention, there is provided a method of coating a substrate comprising the following steps:
applying an improved surface coating medium as described above to a substrate,
drying the coated substrate, and
fixing the coating by hot pressing under mild to moderate heat and pressure.

According to a third aspect of the invention, there is provided a substrate obtainable by
applying an improved surface coating medium as described above to an uncoated substrate,
drying the coated substrate, and
fixing the coating by hot pressing under mild to moderate heat and pressure.

A fourth aspect of the invention is a coated substrate as described above, wherein the substrate comprises fabric and the surface coating medium further contains a polyfunctional reactive additive capable of crosslinking functional groups present on the fusible polymer and/or the binder polymer, the binder polymer being preferably acrylic or polyurethane.

The thermochromic substance (a), the binder polymer (b) and the fusible polymer (c) may be mixed in any suitable ratio but preferably in the range of 10(a):1(b):10(c) to 3(a):5(b):2(c) by weight, especially about 5(a):1(b):4(c).

The invention may be used on a variety of substrates, including fibers or yarns, fabrics, preferably woven fabrics, paper, plastics and any other suitable material.

The choice of binder and fusible polymer is important and preferred binders have three or more of the following properties:

1. Substantial optical clarity when dried or cured;
2. Wash resistance when dried or cured for laundering;
3. Flexibility;
4. Colorlessness;
5. Aqueous based or at least having no low molecular weight organic solvents or chemicals which might damage the thermochromic substance or substances;
6. Sufficient strength to remain adhered to the fiber or fabric during use and washing; and
7. Capable of allowing a fabric to breathe.

Various binders may fulfill most, if not all, of the above desired properties. Suitable binders include aqueous, preferably cross-linkable, polymer emulsions. The polymer can be, for example, polyurethane, acrylic, polyvinyl acetate or polyvinyl chloride, but it will be appreciated that other polymers may prove to be satisfactory for use in the invention.

Preferred binder systems are based on acrylic and methacrylic polymers and copolymers produced by the emulsion or dispersion method in water. Suitable acrylic and methacrylic monomers for such binders include acrylic acid, ethyl acrylate, butyl acrylate, methyl methacrylate and acrylonitrile as main ingredients and styrene, acrylamide, methylol acrylamide, acrylic acid and methacrylic acid as minor ingredients.

Preferred fusible polymers which melt below 300° C., preferably below 120° C., to form a viscous fluid, and to form a nontacky film on cooling are polyesters, in particular polycondensates of dicarbonic acids as, for example, phthalic, terephthalic, succinic, adipic or maleic acid, with diols as for example glycol, propane-1,2-diol or polyamides, in particular polycaprolactams or polycondensates of adipic acid and hexamethylenediamine, especially Griltex 5 ® (TM, a polyamide powder available from EMS-Grilon, UK, Ltd.).

The surface coating medium preferably further comprises a polyfunctional reactive additive which is capable of crosslinking functional groups present on the fusible polymer and/or the binder polymer, preferably an acrylic or polyurethane binder polymer. Suitable crosslinking agents include melamine/formaldehyde resins, polyfunctional aziridine derivatives and zirconium compounds.

The preferred thermochromic substances to be used in the present invention include chiral nematic liquid crystals, cholesteric liquid crystals and smectic liquid crystals. Preferably, microencapsulated chiral nematic liquid crystals suspended in aqueous medium are used in the invention. Various types of suitable thermochromic substances are disclosed in UK patent specification Nos. 1556994, 1592161, 1596012, 1596013, 1596014 and 1603076.

The thermochromic liquid crystal composition preferably comprises at least one compound having a nematic phase and at least one compound having a cholesteric phase. In accordance with a preferred aspect, the liquid crystal composition comprises a mixture of cholesterol esters, cholesterol alkyl carbonates and/or cholesterol chloride. It is also preferred that the liquid crystal composition comprises a mixture of optically active and/or optically inactive phenyl benzoate compounds.

Typical cholesteric compounds have the following formulae:

R—⌬—⌬—CN

R—⌬—⌬—COO—⌬—CN
CE1

R—⌬—⌬—COO—⌬—R
CE2

R—⌬—⌬—COO—⌬—$C_6H_{18}$
CE3

$C_nH_{2n+1}$O—⌬—COO—⌬—R (n = 6, 8, 10, 12; CE4, CE5, CE6, CE7)

$C_nH_{2n+1}$—⌬—⌬—$CO_2$—⌬—R $C_nH_{2n+1}$—⌬—⌬—COO—⌬—R (n = 7, 8; CE11, CE8)

$C_nH_{2n+1}$—⌬—COO—⌬—R (n = 3, 5, 7, 9; CE9, CE10, CE12, CE13)

$C_nH_{2n+1}$—⌬—$CH_2$O—⌬—COO—⌬—R (n = 5; CE15)

wherein
n is preferably 3–12, and
R is $CH_3CH_2\overset{*}{C}H$—$CH_2$;
|
$CH_3$ R*—OCO—(⌬)$_m$—COO—R* wherein
m is 1 or 2, and
R* is

—CH—$C_6H_{13}$    or    —CH—$COOC_2H_5$;
|                                |
$CH_3$                       $CH_3$ and R(—O)$_p$CO—O—[cholesteryl]

wherein
p is 0 or 1.

The designation CE is the acronym of the given chiral structure. In the case that an R follows, it means the racemic mixture.

Typical nematic host materials have the following formulae:

$C_nH_{2n+1}$—⌬—COO—⌬—$C_qH_{2q+1}$     MEnq $C_nH_{2n+1}$O—⌬—COO—⌬—$C_qH_{2q+1}$    MEnO.q $C_nH_{2n+1}$—⌬—COO—⌬—O—$C_qH_{2q+1}$    MEnOq $C_nH_{2n+1}$O—⌬—COO—⌬—O—$C_qH_{2q+1}$   MEnO.Oq wherein n and q are each 1–18, preferably 2–12, especially 3–7.

As thermochromic liquid crystal preferably a microencapsulated thermochromic liquid crystal composition is used, preferably Licritherm ® TCC-216, TCC-1001, or other Licritherm ® products formulated to show colors in a specified temperature interval appropriate to the application.

The designation TCC means that the mixture has been microencapsulated according to the process of U.S. Pat. No. 2,800,457 (Example 2).

| TCC-216: | |
|---|---|
| CE4 | 23.06% |
| CE4R | 7.72% |
| CE5 | 11.68% |
| CE6 | 18.06% |
| CE7 | 15.03% |
| ME805 | 14.88% |
| CE10R | 9.58% |
| TCC-1001: | |
| CE4 | 17.89% |
| CE4R | 15.38% |
| CE5 | 28.72% |
| CE6 | 19.00% |
| ME105 | 7.7% |
| ME805 | 11.3% |

The thermochromic substances used in the present invention preferably exhibit several color changes over a range of temperatures, typically -30-150 degrees Celsius, preferably 0-50 degrees Celsius, and especially temperatures such as produced by contact with the body. The thermochromic substances may be colorless or black and typical color changes may be from colorless or black to tan to red to green to blue. Two or more thermochromic substances may be used which change color at different temperatures so that a mixture of color changes may be produced.

The method of the invention may be used on individual fibers, fabrics prior to making up into a garment or other article and the finished article itself. Preferred fibers and fabrics will be black, although other dark colored substrates have also been found to be suitable. Paler colored substrates may also be used by first overprinting with a darker, preferably black layer. They may also advantageously be fine, thin or supple. Suitable fabrics include cotton, polyester, silks and chiffons.

The compositions used in the invention may be applied to fibers and fabrics in any suitable way, such as by printing, including screen printing, spraying, dipping, brushing, laminating, doctor bar, wire wound bar and electrostatic pressing. See, e.g., WO 90/02054.

The coating may be dried at a temperature/time sufficient to drive out water from the layer, preferably at 40°-80° C. or 5-60 minutes, in particular at 50° C. for 10-20 minutes to provide the uncured layer which is then fixed by hot pressing under mild to moderate heat and pressure, preferably over the melting point of the fusible polymer, preferably at 100°-150° C., in particular 110°-130° C. at a pressure of 1 to 3 N/cm$^2$, in particular 1 to 2 N/cm$^2$. The compositions used in the invention may be applied all over a fabric or to discrete areas thereof.

The coating media used in the invention may include further substances such as processing aids for the method of application to be used. Other additives may include U.V. stabilizers, anti-foaming agents, surfactant stabilizers, antioxidants, thickeners, viscosity modifiers, humectants, cross-linking agents and fire-retardant substances.

The invention may provide a means of producing a clearly defined, clearly visible thermochromic effect on a variety of substrates.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications cited above and of corresponding British application 9207646.2, are hereby incorporated by reference.

EXAMPLES

The invention will now be further described by means of the following Examples:

EXAMPLE 1

A surface coating medium is made containing 30 parts by weight of an encapsulated thermochromic liquid crystal dispersion Licritherm ® TCC-1001 (commercially available from Merck Ltd., Poole/UK), 5 parts by weight of an acrylic polymer HV30 ® (commercially available from Allied Colloids Ltd.), 30 parts by weight of a fusible polyamide powder Griltex 5 ® (P1) (commercially available from EMS-Grilon UK, Ltd.), 5 parts by weight of an ammonia solution (10% aqueous solution) and 30 parts by weight of water.

The medium is printed onto a woven black polyester/cotton fabric by screen printing (180 threads per inch) and air-dried at 50° C. for 10 minutes.

The substrate was then hot pressed at 120° C. and 1.2 N/cm$^2$ to provide a thermochromic surface coating with good color brightness and soft feel. The fabric is washed 20 times in a 1% solution of a commercially available washing powder, Dreft ®, at 40° C.; after this treatment, the colors are still bright.

EXAMPLE 2

A composition for coating a fabric is produced by mixing 30 parts by weight of Licritherm ® suspension TCC-216 (microencapsulated chiral nematic liquid crystal supplied by Merck Ltd.) with 5 parts by weight of an aqueous acrylic emulsion and 30 parts by weight of the fusible polymer of Example 1.

The composition was used to coat and cure a black fabric and the resultant coated fabric exhibited color changes with the changes in temperature from skin contact with the fabric and from breathing on the fabric and cannot be washed out with washing powder.

EXAMPLE 3

A mixture was made of 40 parts by weight TCC-1001, 40 parts by weight Griltex ® 5, 10 parts by weight of NeoRez ® R-970, polyurethane latex, commercially available from ICI Resins, of Waalwijk, Holland, 5 parts by weight of HV30 ®, and 5 parts by weight of 10% aqueous ammonia solution.

Prior to printing, the above mixture was blended with a polyfunctional aziridine crosslinking agent CX 100 ®, commercially available from ICI Resins, in the ratio of 98:2 by weight. The resulting formulation was screen printed onto black cotton fabric through a polyester mash of 54 threads per inch. After air drying at 25° C. for 30 minutes, the layer was pressed at 120° C. and 10 N/m$^2$ to give a smooth thermochromic finish with good wash resistance and excellent handle.

EXAMPLE 4

The procedure of Example 3 was followed, but in place of the CX 100 ® crosslinking agent, the formulation is mixed with a melamine/formaldehyde resin BE340 ®, commercially available from BIP, in the ratio 95:5. After drying and hot pressing as in Example 3, a robust thermochromic fabric finish with good wash resistance is obtained.

EXAMPLE 5

A mixture was made of 30 parts by weight Griltex ® 5, 30 parts by weight TCC-1001, 5 parts by weight of carbon black, 7 parts by weight of 2-hydroxy-4-methoxy benzophenone, 4 parts by weight of HV30 ®, 4 parts by weight of 10% aqueous ammonia solution, and 20 parts by weight of NeoRez ® R-970. The resulting ink was printed as in Example 3 onto a white cotton fabric, and dried and hot pressed as in Example 3. The resulting print showed thermochromic colors against a dark gray background and had enhanced resistance to UV radiation.

EXAMPLE 6

A mixture was made of 33.84 parts by weight of TCC-1001, 30 parts demineralised water, 17 parts by weight of a copolyamide powder (melting range 120°–130° C.) coded Griltex ® Copa 2 Pl, 14 parts by weight of an aqueous urethane emulsion coded Lankrothane ® EL1011, 2.5 parts by weight HV30 ®, 1.25 parts by weight of a fluoro surfactant/levelling agent coded Fluorad ® FC170C, 0.51 parts by weight of an antifoaming agent coded Balab ® 3056A and 0.90 parts by weight of 10% aqueous ammonia solution.

The resulting formulation is screen printed onto black cotton fabric through a polyester mesh of 54 threads per inch. After air drying at 25° C. for 30 minutes, the layer was pressed at 135° C. and 2.5 N/cm² to give a smooth thermochromic finish with high wash resistance and excellent handle.

COMPARISON EXAMPLE

A woven black polyester/cotton fabric is treated according to Example 1 with a surface coating consisting of 30 parts of TCC-1001, 5 parts acrylic polymer HV30 ® 30 parts of a non-fusible acrylic resin Glascol LE5 ® (commerically available from Allied Colloids) and washed with a 1% solution of Dreft ® at 40° C. 4 times. The substrate loses its color after washing.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A surface coating medium comprising a mixture of:
   a microencapsulated thermochromic liquid crystal,
   a binder polymer capable of forming a film which binds said microencapsulated thermochromic liquid crystal when in a dried, uncured state, and
   a fusible polymer which is different from said binder polymer, is capable of melting below 300° C. to form a viscous fluid, and is capable of forming a nontacky film on cooling,
   wherein said binder polymer is in the form of an emulsion, and said fusible polymer is a polyester powder or polyamide powder.

2. A surface coating medium according to claim 1, wherein the melting point of said fusible polymer is below 120° C.

3. A surface coating medium according to claim 1, wherein said binder polymer is an emulsion acrylic or urethane which is present in sufficient quantity to bind powdered fusible polymer before fusion.

4. A surface coating medium according to claim 1, wherein said binder polymer is water soluble.

5. A surface coating medium according to claim 3, wherein said binder polymer is water soluble.

6. A surface coating medium according to claim 3, wherein said medium further contains a polyfunctional reactive additive capable of crosslinking functional groups present on said fusible polymer and/or on the acrylic or polyurethane binder.

7. A surface coating medium according to claim 6, wherein said crosslinking agent is a melamine/formaldehyde resin, a polyfunctional aziridine compound or a zirconium compound.

8. A surface coating medium according to claim 1, wherein said thermochromic liquid crystal is a liquid crystal composition comprising at least one compound having a nematic phase and at least one compound having a cholesteric phase.

9. A surface coating medium according to claim 8, wherein said liquid crystal composition comprises a mixture of cholesteryl esters, cholesteryl alkyl carbonates and/or cholesteryl chloride.

10. A surface coating medium according to claim 8, wherein said liquid crystal composition comprises a mixture of optically active and/or optically inactive phenyl benzoate compounds.

11. A surface coating medium according to claim 1, wherein said binder polymer is an aqueous polymer emulsion wherein the polymer is polyurethane, an acrylic polymer, polyvinyl acetate or polyvinyl chloride.

12. A surface coating medium according to claim 1, wherein said binder polymer is an acrylic or methacrylic polymer or copolymer in an aqueous emulsion.

13. A surface coating medium comprising a mixture of:
   a microencapsulated thermochromic liquid crystal,
   a binder polymer capable of forming a film which binds said microencapsulated thermochromic liquid crystal when in a dried, uncured state, and
   a fusible polymer which is different from said binder polymer, is capable of melting below 300° C. to form a viscous fluid, and is capable of forming a nontacky film on cooling,
   wherein said binder polymer is in the form of an emulsion, and said fusible polymer is a polycondensate powder formed by reacting a dicarbonic acid with a diol or is a polyamide powder.

14. A surface coating medium according to claim 1, wherein said binder polymer is a aqueous polyurethane emulsion or an aqueous polyvinyl acetate emulsion.

15. A surface coating medium according to claim 1, wherein said microencapsulated thermochromic liquid crystal, said binder polymer, and said fusible polymer, are present in the ratio of 10:1:10–3:5:2.

16. A surface coating medium according to claim 14, wherein said microencapsulated thermochromic liquid crystal, said binder polymer, and said fusible polymer, are present in the ratio of 10:1:10–3:5:2.

* * * * *